July 26, 1932.   N. H. HENDERSON   1,868,603
MOWING MACHINE BLADE GRINDER
Filed July 29, 1931   3 Sheets-Sheet 1

Inventor
Nelson H. Henderson
By Clarence A. O'Brien
Attorney

July 26, 1932.  N. H. HENDERSON  1,868,603
MOWING MACHINE BLADE GRINDER
Filed July 29, 1931   3 Sheets-Sheet 2

Inventor
Nelson H. Henderson
By Clarence A. O'Brien
Attorney

July 26, 1932. N. H. HENDERSON 1,868,603
MOWING MACHINE BLADE GRINDER
Filed July 29, 1931 3 Sheets-Sheet 3

Inventor
Nelson H. Henderson
By Clarence A. O'Brien
Attorney

Patented July 26, 1932

1,868,603

UNITED STATES PATENT OFFICE

NELSON H. HENDERSON, OF CLARKEDALE, ARKANSAS, ASSIGNOR OF ONE-HALF TO A. C. PARKER, OF CLARKEDALE, ARKANSAS

MOWING MACHINE BLADE GRINDER

Application filed July 29, 1931. Serial No. 553,857.

This invention relates to a mowing machine blade grinder and has for one of its objects to provide, in a manner as hereinafter set forth, a grinder of this character embodying a novel construction, combination and arrangement of parts whereby the same may be expeditiously mounted for operation on conventional tractors in a manner which will interfere in no way with the functioning of the tractor and without the necessity of materially altering said tractor structurally, the device being particularly intended for mounting on the cultivator pivot bracket of a Farm-All tractor or on the implement attaching bolt of a John-Deere tractor.

Another important object of the invention is to provide a mowing machine blade grinder of the character set forth embodying novel means for supporting and automatically feeding the blade to the grinding wheel or stone, the device further including means for connection with the usual power take-off pulley of the tractor for actuation thereby.

Other objects of the invention are to provide a mowing machine blade grinder of the character described which will be simple in construction, strong, durable, efficient and reliable in use and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 6 is a detail view in perspective of one end portion of the blade supporting means.

Figure 1:
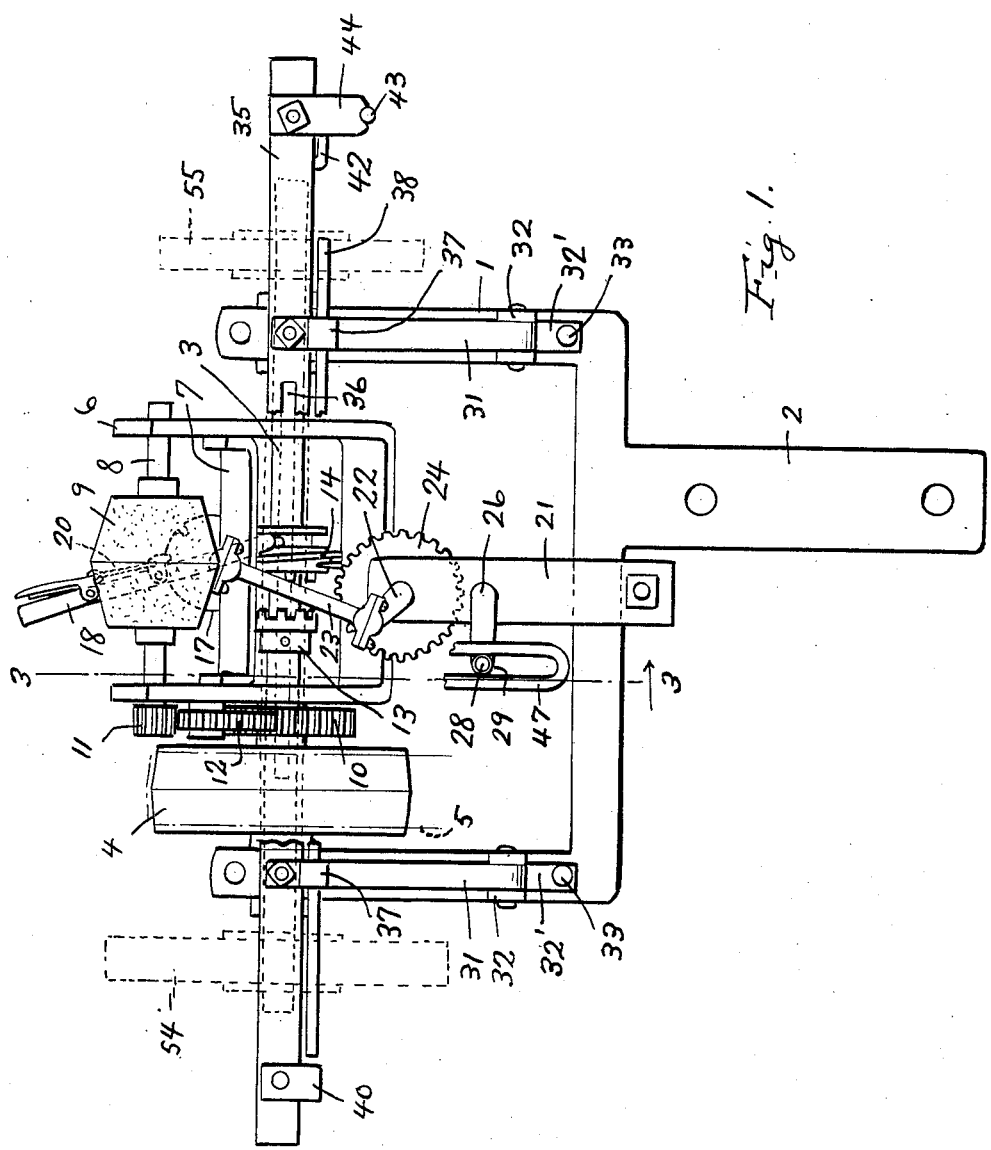
Figure 1 is a view in rear elevation of a mowing machine blade grinder in accordance with this invention, portions thereof being broken away to better illustrate the mechanism.
Figure 2:
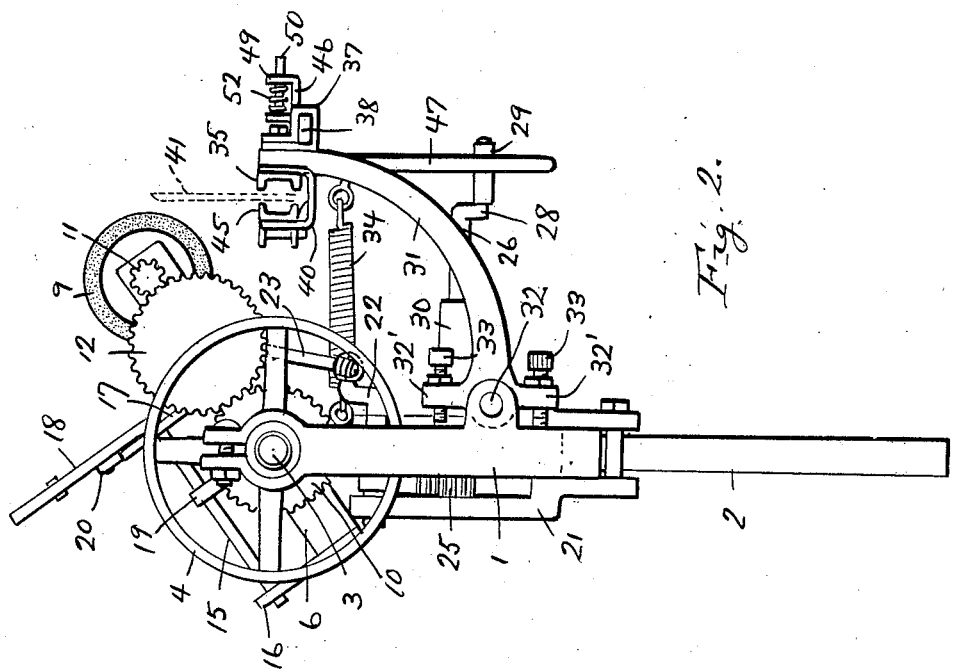
Figure 2 is a view in side elevation of the grinder.
Figure 5:
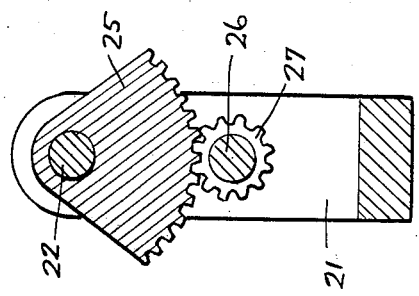
Figure 5 is a detail view in section taken substantially on the line 5—5 of Figure 3.

Referring now to the drawings in detail, it will be seen that the blade grinder constituting the present invention comprises a substantially U-shaped frame 1 having an apertured shank 2 formed integrally therewith for connection with the tractor. The end portions of the frame 1 are provided with alined bearings in which a shaft 3 is journaled. A pulley 4 is fixed on the shaft 3 between the end portions of the frame 1 and adjacent one of said end portions of the frame. An endless belt 5 is trained over the pulley 4 and over the power take-off pulley of the tractor for actuating the shaft 3. It may be well to here state that the ends of the shaft 3 project beyond the frame 1 for a purpose which will be presently set forth.

Mounted for swinging movement on an intermediate portion of the shaft 3 is a substantially U-shaped bracket 6 having a transverse brace 7 in an intermediate portion thereof. A shaft 8 is journaled transversely in the open end portion of the bracket 6 and has fixed thereon within said bracket a grinding stone or wheel 9. A gear 10 is fixed on the shaft 3 between the bracket 6 and the pulley 4 and a gear 11 is fixed on one end portion of the shaft 8 and is operatively connected to the gear 10 for actuation thereby through the medium of an intermediate gear 12 which is rotatably mounted on one side of the bracket 6.

A clutch member 13 is fixed on the shaft 3 within the bracket 6. A worm gear 14 is slidably mounted on the shaft 3 within the bracket 6 and is provided with clutch teeth on one side for engagement with the clutch member 13 for connecting the worm gear to the shaft for rotation therewith. A rod 15 is journaled for oscillation in supporting brackets 16 and 17 provided therefor on the closed end of the bracket 6 and the brace 7 respectively and said rod terminates at one end in an operating lever 18. A yoke 19 operatively connects the worm gear 14 to the rod 15 for actuation thereby when said rod 15 is rocked. The upper end of the bracket 17 is notched for engagement by a latch or detent 20 mounted on the lever 18 for securing said lever in adjusted position against swinging movement.

Figure 3:
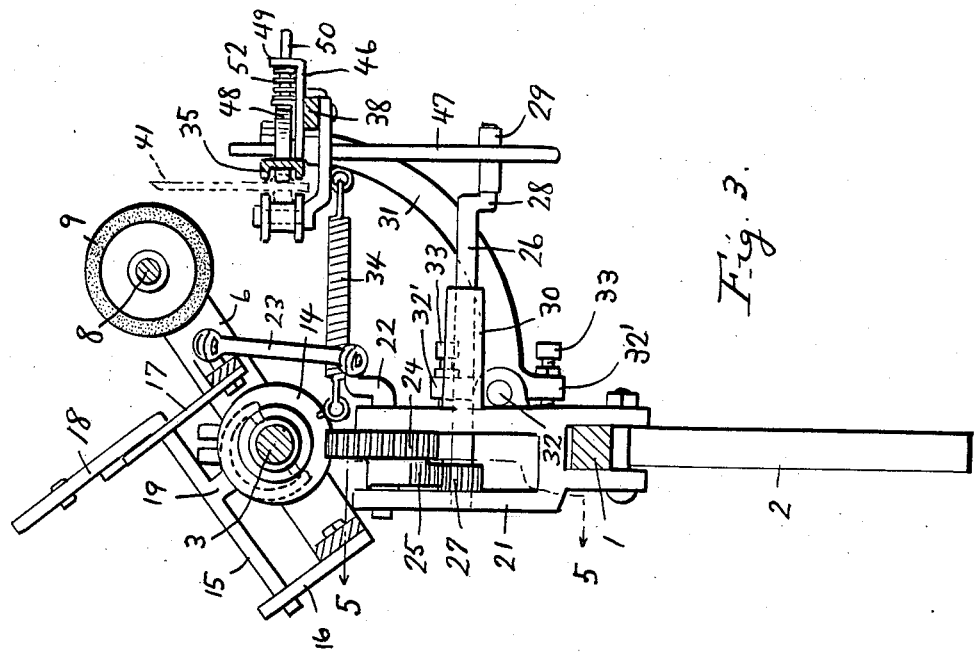
Figure 3 is a sectional view taken substantially on the line 3—3 of Figure 1, looking in the direction indicated by the arrow.
Figure 4:
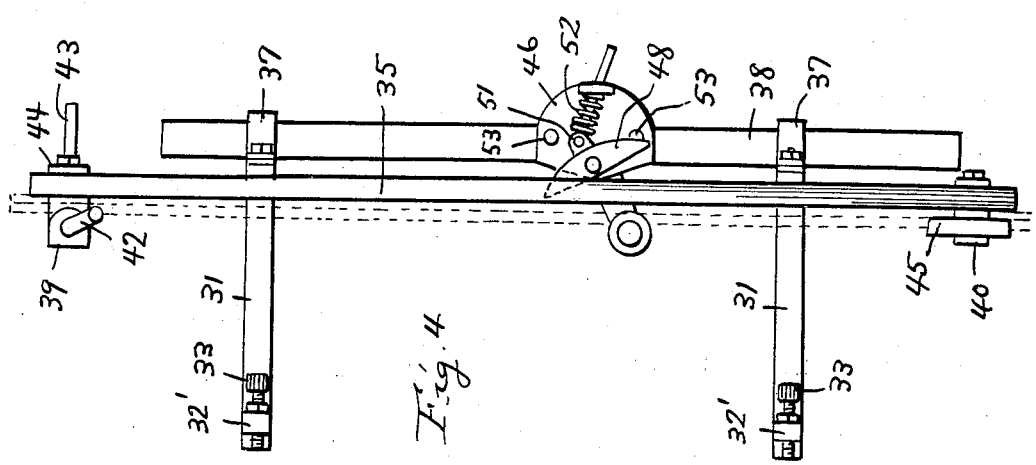
Figure 4 is a detail view of the blade supporting and feeding means.

A bracket 21 is rigidly mounted on an intermediate portion of the frame 1 and has journaled thereon a crank shaft 22. A pitman 23 operatively connects the bracket 6 to the crank shaft 22 for actuation thereby. One end of the pitman 23 is connected by a suitable joint to the brace 7 of the bracket 6 and the other end of the pitman 23 is connected by a suitable joint to the crank of the crank shaft 22, as illustrated to advantage in Figure 3 of the drawings. A gear 24 is fixed on the crank shaft 22 within the bracket 21 for operative engagement and actuation by the worm gear 14, on the shaft 3. A segmental gear 25 is fixed on one side of the gear 24.

A shaft 26 is also rotatably mounted on the bracket 21 and has fixed thereon within said bracket 21 a gear 27 for engagement and periodic actuation by the segmental gear 25. At its outer end, the shaft 26 terminates in a crank arm 28 having a roller 29 journaled thereon. A supporting tube 30 projects from one side of the bracket 21 through which the shaft 26 rotatably extends.

Arcuate arms 31 are hingedly connected, as at 32, to the frame 1 and the hingedly connected end of said arms are provided with the oppositely extending lugs 32' through which adjusting bolts 33 are threaded for engagement with the frame 1 for adjusting and maintaining the arms 31 in the desired position. Coil springs 34 have one end connected to the free end portions of the arms 31 and their other ends connected to the frame 1 for yieldingly urging the arms toward the grinding stone or wheel 9.

A channel bar 35 is fixed on the free end portions of the arms 31 and at a point between said arms, the channel bar 35 is provided with a slot 36. Brackets 37 are mounted on the outer side of the channel bar 35 and slidably mounted in said brackets is a bar 38. Brackets 39 and 40 are mounted on the end portions of the channel bar 35 for slidably supporting the blade 41 in position. A keeper 42 is mounted for swinging movement on the bracket 39 for engagement with the blade, said keeper 42 including a lever 43 which is engageable with a notched plate 44 for releasably securing the keeper against swinging movement. A channel shaped guide 42' is disposed opposite to the channel bar 35 and is provided in relatively opposite sides thereof with apertures for receiving the upstanding end of the keeper 42. The member 42' accommodates the rivet heads on the blade, and serves to assist in holding the blade in position. The bracket 40 is substantially U-shaped and has one arm bolted to the channel bar 35. A channel-shaped member 45 is fixed on the other arm of the bracket 40 for sliding contact with the blade 41.

A plate 46 is fixed on an intermediate portion of the slidable bar 38 and fixed to said blade and depending therefrom is a yoke 47 in which the crank arm 28 of the shaft 26 is operatively engaged. One end portion of the yoke 47 projects upwardly above the plate 46 and has mounted for swinging movement thereon a double-ended dog 48 which is operatively engageable with the rivet heads usually found on the mower blade 41. The shaft 26 constitutes means for actuating the blade feeding and controlling mechanism.

An upstanding, apertured ear 49 is provided on the outer marginal portion of the plate 46 and extending slidably therethrough is a rod 50 having one end pivotally connected, as at 51, to an intermediate portion of the dog 48. A coil spring 52 encircles the inner portion of the rod 50 and has one end bearing against the ear 49 and its other end operatively connected with the rod 50. The coil spring 52 constitutes means for imparting a "snap" movement to the dog 48. Stop pins 53 rise from the plate 46 for engagement by the end portions of the dog 48 for limiting the swinging movement of said dog under impulsion by the coil spring 52. The dog 48 is operable through the slot 36 of the channel bar 35 for engagement with the mower blade 41.

If desired, a wire brush 54 may be mounted on one of the projecting end portions of the shaft 3 for cleaning or polishing the mower blade. Also, an emery wheel 55 may be mounted on the other projecting end portion of the shaft 3 for sharpening other tools.

In use, the blade is positioned in the rack constituted by the channel bar 35 and the brackets 39 and 40 which are mounted on said channel bar. The coil springs 34 yieldingly urge the arms 31 in a direction to engage the blade with the grinding stone 9. The blade feeding and controlling mechanism which includes the dog 48, the plunger rod 50, and the slidable bar 38, are actuated intermittently by the shaft 26 through the medium of the segmental gear 25 engaging the gear 27 on said shaft 26. The blade is fed through the machine a section at a time in this manner. As the blade is shifted the crank shaft 22 raises the bracket 6 in a manner to disengage the grinding stone 9 during the shifting of the blade.

When it is desired to prevent automatic feeding of the blade through the machine and to prevent raising of the grinding stone 9, the lever 18 is actuated to shift the worm gear 14 simultaneously out of engagement with the clutch member 13 and with the gear 24 on the crank shaft 22.

It is believed that the many advantages of a blade grinder in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:

1. A blade grinder of the character described comprising a supporting frame, a shaft journaled on the frame, means for connecting the shaft to a source of power, a grinding stone supported on the shaft, means operatively connecting the grinding stone to the shaft for actuation thereby, blade supporting means mounted on the frame, blade shifting means mounted on the blade supporting means, and means operatively connecting the blade shifting means to the shaft for intermittent actuation thereby.

2. A blade grinder of the character described comprising a supporting frame, a shaft journaled on the frame, means for connecting the shaft to a source of power, a bracket mounted for swinging movement on the shaft, a grinding stone rotatably mounted on the bracket, means connecting the grinding stone to the shaft for actuation thereby, blade supporting means mounted on the frame, blade shifting means mounted on the blade supporting means, means operatively connecting the blade shifting means to the shaft for intermittent actuation thereby, and means operatively connecting the bracket to the shaft for swinging actuation by said shaft.

3. A blade grinder of the character described comprising a supporting frame, a shaft journaled on the frame, means for connecting the shaft to a source of power, a bracket mounted for swinging movement on the shaft, a grinding stone rotatably mounted on the bracket, gears connecting the grinding stone to the shaft for actuation thereby, blade supporting means mounted for swinging movement on the frame, resilient means connected with the blade supporting means for yieldingly urging the same toward the grinding stone, blade shifting means operatively mounted on the blade supporting means, means operatively connecting the blade shifting means to the shaft for periodic actuation thereby, and means operatively connecting the brackets to the shaft for swinging actuation by said shaft.

4. A blade grinder of the character described comprising a supporting frame, a shaft journaled on the frame, means for connecting the shaft to a source of power, a substantially U-shaped bracket mounted for swinging movement on the shaft within the frame, a grinding stone rotatably mounted on the bracket, gears operatively connecting the grinding stone to the shaft for actuation thereby, blade supporting means mounted for swinging movement on the frame, springs connected to the blade supporting means for yieldingly urging the same toward the grinding stone, blade shifting means operatively mounted on the blade supporting means, a crank shaft rotatably supported on the frame, clutch controlled means operatively connecting the crank shaft to the first named shaft for actuation thereby, means operatively connecting the blade shifting means to the crank shaft for periodic actuation thereby, and means connecting the bracket to the crank shaft for swinging actuation by said crank shaft.

In testimony whereof I affix my signature.

NELSON H. HENDERSON.